Feb. 9, 1943.     E. H. HAUX     2,310,432

COMPOSITE BUILDING UNIT

Filed Oct. 7, 1938

INVENTOR.
ELMER H. HAUX
BY Bradley & Bee
ATTORNEYS.

Patented Feb. 9, 1943

2,310,432

UNITED STATES PATENT OFFICE 2,310,432

COMPOSITE BUILDING UNIT

Elmer H. Haux, Tarentum, Pa., assignor to Pittsburgh Plate Glass Company, Allegheny County, Pa., a corporation of Pennsylvania Application October 7, 1938, Serial No. 233,769

3 Claims. (Cl. 49—77)

The present invention relates to cellulated vitreous materials and more particularly to composite building units in which the separate strata have varying densities.

The primary object of the present invention is the provision of light-weight building units having increased strength with but slight reduction in insulating characteristics and capable of self-contained decorative effects.

Other objects and advantages of the invention will become more apparent from the following detailed description of certain preferred embodiments thereof.

Cellulated vitreous materials and particularly cellular glass may be produced in numerous ways. For example, it has been shown that molten glass when placed in a mold and subjected to a high vacuum will expand with the formation therein of gas cells to produce a highly desirable insulating material. A second process entails the use of a sulfate glass and a reducing compound to produce the same effects. A third process, and one which is particularly applicable to the present invention, contemplates the admixture of a gassing agent with crushed glass and a subsequent heating of the mixture to produce cellular glass.

Regardless of the process of manufacture a unit of cellular glass sufficiently light in weight to possess a high thermal insulating value will not possess the same resistance to impacts as a solid body. Where, therefore, slabs of cellular glass are used in forming the walls of a building a reasonably heavy impact will rupture the section, or at least pierce the outer surface thereof. Such action destroys the waterproof skin and will permit moisture penetration and accumulation in the wall structure. Attempts have been made to increase the apparent specific gravity of the cellular glass to that point at which a satisfactory balance may be drawn between the strength of the cellular glass and its insulating value. It has been found, however, that a unit possessing satisfactory resistance to breaking is materially deficient in thermal insulating effect, and is in fact but slightly superior to cheaper and more common materials, such as brick, concrete, or wood.

Briefly stated, the present invention obviates the foregoing difficulties by forming building units of a base of cellular glass of low apparent density and a covering or facing stratum of dense cellular glass. The light stratum affords good insulating properties while the dense stratum acts as a protective skin or plate.

Figure 1:
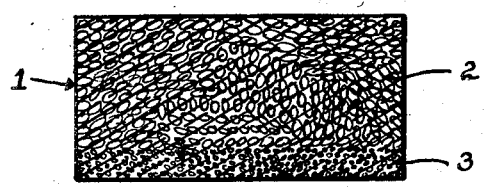
Figure 2:
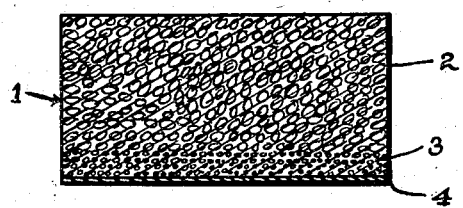

In the accompanying drawing Figure 1 is a horizontal sectional view of a building unit embodying the provisions of my invention and Figure 2 is a horizontal sectional view of a modification thereof.

Referring to the drawing, a building unit I formed in any desired size and shape is composed of a body 2, of a cellulated vitreous material, such as glass or blast furnace slag having a low apparent density. A surface strata 3, of a thickness substantially less than that of the body section, is composed of a dense, cellulated vitreous material. As shown in Figure 2 an additional strata 4 of a vitreous glaze, which may, or may not, be admixed with an inert coloring material, may be applied over the layer 3 of the unit.

The building units are preferably prepared in molds, although a continuous process may be employed, in which larger sections of material are produced and are subsequently cut into smaller segments of the desired size and shape. Where molds are used, the bottoms thereof are covered with a relatively heavy layer of a mixture of pulverulent glass or other vitreous material and a suitable gassing agent. There is then added to the molds a second layer, of greater thickness than the first, of pulverulent vitreous material admixed with a larger amount of a suitable gassing agent. The granular strata do not completely fill the molds for it is necessary that sufficient space be left for subsequent expansion of the vitreous material. The molds are then fired at a temperature of from 1500 to 1750 degrees F.

During the heating cycle, the pulverulent vitreous material sinters at a temperature of from 1200 to 1500 degrees F., depending upon its nature, and forms a gas impermeable body which becomes more fluid with increasing temperatures. The absorption of additional heat by the vitreous material results in a decomposition of the gassing agents admixed therewith and the formation of cells or bubbles of carbon dioxide gas distributed throughout the entire body. Heating of the molds is continued until the decomposition of the gassing agents is complete and the vitreous body has expanded bloated to the desired degree. The molds are then cooled slowly in order that proper annealing of the vitreous bodies is obtained. In certain instances, there will be experienced sufficient contraction of the expanded body on partial cooling, that the product may be removed from the molds and annealed more rapidly in the usual way without entailing a complete cooling of the molds themselves. Accordingly when these semi-heated molds are again loaded less heat will be necessary to bring the charge up to the proper firing temperature.

Since the lower stratum of vitreous material contains a less amount of gassing agent than the main body stratum, decomposition thereof will result in fewer or smaller gas cells being created therein. Manifestly, therefore, the lower stratum will be more dense than the body section and will provide the desired protective cover for the cellular building unit. Obviously, the layer of crushed vitreous material containing the lesser amount of gassing agent may be superposed upon the thicker layer of crushed vitreous material containing the larger amount of gassing agent and the resultant product will be entirely satisfactory. It should also be noted that the comparative thicknesses of the two strata may be varied within wide limits. As the thickness of the dense layer is increased, the unit will have a progressively greater resistance to impact, with, however, a decreasing insulating efficiency.

The apparent specific gravity of the two strata is of course governed by the amounts of gassing agents contained therein. It has been ascertained that from 1 to 1.5 per cent of a gassing agent is most desirable for the lighter body section, while from 0.1 of 1 per cent to 0.25 of 1 per cent may be employed in the more dense, covering layer. The foregoing percentages produce optimum physical characteristics when calcium carbonate is the gassing agent. Other materials such as carbon, aluminum sulfate, cobaltic oxide and manganous oxide could be substituted for the calcium carbonate without difficulty.

Various modifications in the process will permit almost unlimited decorative effects to be obtained. For example, an inert coloring material may be admixed with the crushed vitreous material forming the dense cover stratum. The product would thus require no additional treatment or finishing after installation. A portion of the crushed vitreous material may be replaced with crushed brick or rock to give a different physical aspect to the finished unit. In this respect crushed brick and glass may be combined in equal proportions to good effect.

As is illustrated in Fig. 2 of the drawing, a layer of a low melting vitreous enamel may be applied to the composite unit before heating and the product will have a surface glaze. Variegated colors and patterns may be applied in this way to the units during their production.

The finished unit comprises a layer of dense, protective material fused to a body of less dense and highly non-conductive cellular glass. The unit is produced in a single operation, a factor serving to reduce materially manufacturing costs. For practical installations, the units are assembled in a building wall with the strata disposed in a vertical plane, the denser stratum, of course, being faced outwardly.

It will at once be obvious that various modifications in the composition of the unit and in the arrangement of the several elements thereof are possible without departing from the spirit of the invention or the scope of the appended claims.

What I claim is:

1. A process of forming from crushed vitreous material a bloated cellular body having a moderately expanded relatively dense facing layer and a highly expanded backing layer of low density, which process comprises superposing in a mold a plurality of layers of crushed vitreous material corresponding to the desired layers in said bloated cellular body, the top layer corresponding to the backing layer and containing a relatively large amount of a gassing agent and the bottom layer corresponding to the facing layer and containing a lesser amount of the gassing agent, said agent being decomposable by heat at a temperature above that of sintering of the vitreous material to liberate a bloating gas, heating the layers in the mold to a temperature above that of sintering and softening of the vitreous material and decomposition of the gassing agent, whereby the particles of vitreous material are cohered and the gases from the gassing agent are liberated in the cohered and softened mass to form a cellulated and expanded body, comprising said layers bonded together into a unitary whole and annealing and cooling the body.

2. A process of forming from crushed vitreous material a bloated cellular body having a moderately expanded relatively dense facing layer and a highly expanded backing layer of low density, which process comprises superposing in a mold a plurality of layers of crushed vitreous material corresponding to the desired layers in said bloated cellular body, the top layer corresponding to the backing layer and containing a relatively large amount of a gassing agent and the bottom layer corresponding to the facing layer and containing a lesser amount of the gassing agent, said agent being decomposable by heat at a temperature above that of sintering of the vitreous material to liberate a bloating gas, heating the layers in the mold simultaneously to a temperature above that of sintering and softening of the vitreous material and decomposition of the gassing agent and approximately within a range of 1500 to 1750° F., whereby the particles of vitreous material are cohered and the gases from the gassing agent are liberated in the cohered and softened mass to form a cellulated and expanding body, comprising said layers bonded together into a unitary whole and annealing and cooling the body.

3. A process of forming from crushed vitreous material a bloated cellular body having a moderately expanded relatively dense facing layer and a highly expanded backing layer of low density, which process comprises superposing a plurality of layers of crushed vitreous material corresponding to the layers in said bloated cellular body, the layer corresponding to the backing layer containing about 1 to 1½% of calcium carbonate as a gassing agent and the layer corresponding to the facing layer containing about ⅛ to ¼% of calcium carbonate, the crushed vitreous material being sinterable to form a coherent mass at a temperature below that of complete liberation of carbon dioxide from the calcium carbonate, heating the layers to a temperature above that of sintering and softening of the vitreous material and decomposition of the gassing agent and approximately within a range of 1500 to 1750° F., whereby the particles of vitreous material are cohered and the gases from the gassing agent are liberated in the cohered and softened mass to form a cellulated and expanded body, comprising said layers bonded together into a unitary whole.

ELMER H. HAUX.